Nov. 27, 1945.   J. ROSENTHAL   2,389,998
AUTOMATIC TAPPING AND THREADING MACHINE
Filed Aug. 23, 1944
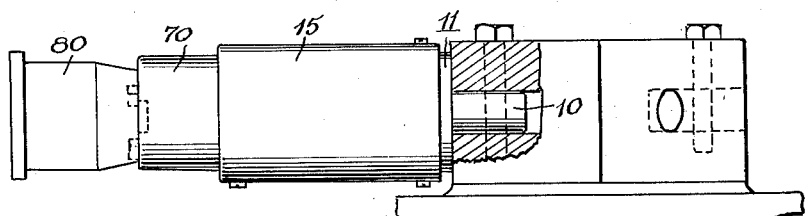
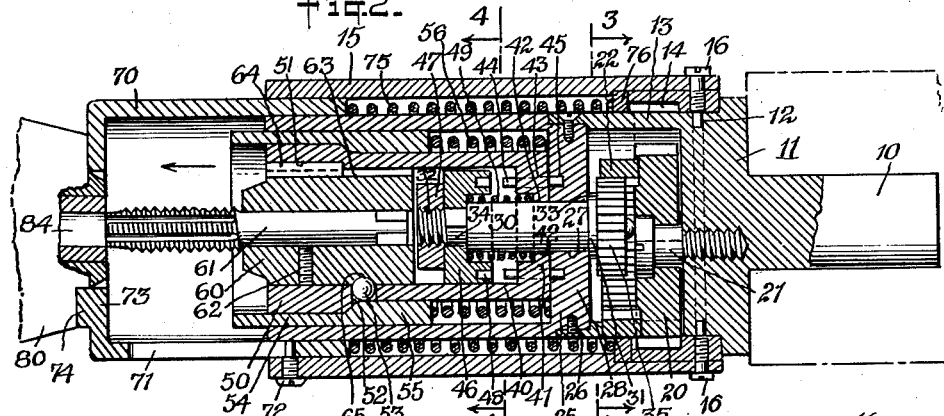
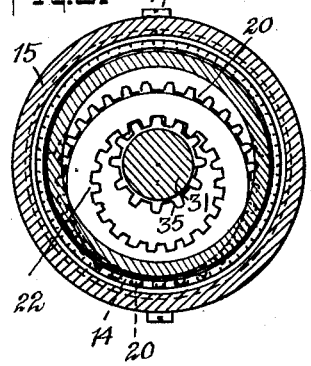
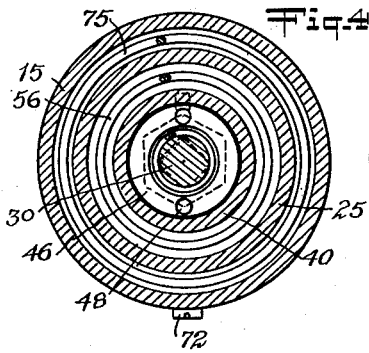
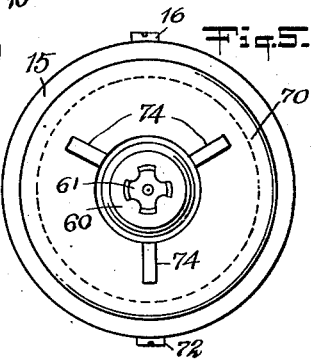
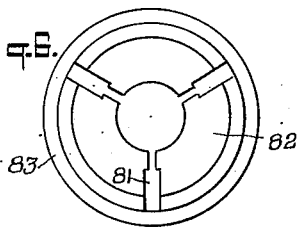
INVENTOR.
Jack Rosenthal
BY
ATTORNEYS Patented Nov. 27, 1945

2,389,998

UNITED STATES PATENT OFFICE 2,389,998

AUTOMATIC TAPPING AND THREADING MACHINE

Jack Rosenthal, Brooklyn, N. Y.

Application August 23, 1944, Serial No. 550,752

4 Claims. (Cl. 10—138)

The present invention relates to automatic tapping and threading machines.

An object of the invention is to provide a machine which will avoid the necessity of stopping the work, or rotating the same in a direction opposite to the direction in which it is rotated during the tapping operation, when it is desired to disengage the tap from the work, and instead, to effect the easy withdrawal of the tap by imparting to it a rotary movement relative to the work, and in such direction that the tap will be unscrewed automatically from the work.

Another object is the provision of an automatic tapping and threading attachment for standard turret lathes in which, during the tapping operation, the tap is positively locked against rotation, but during the tap releasing operation the tap is caused to rotate at a rate of speed which is higher than the rate of speed of the work, the direction of rotation of both tap and work being the same, thereby producing the unscrewing operation of the tap and at the same time axially withdrawing it from the work.

A further object is the provision of such tapping and threading attachment in which, during the tap releasing operation, the tap derives the motive power which effects its rotation, from the rotating work holding means that is standard equipment in turret lathes.

Still another object is the provision of a device of the character described which is small, compact and handy to use on standard machines, and which is of simple, inexpensive construction.

These and other objects are attained by mechanism illustrated in the accompanying drawing in which Figure 1 is a plan view of the device showing it locked in a turret of standard construction;

Figure 2 is a longitudinal section of the device;

Figure 3 is a transverse section on the line 3—3 of Figure 2;

Figure 4 is a transverse section on the line 4—4 of Figure 2;

Figure 5 is a bottom or face view of the device; and

Figure 6 is a face view of the work holding chuck.

The principle of the invention lies in the fact that as between two axially aligned bodies, relatively slow rotation of one body, and relatively fast rotation of the other body in the same direction is equivalent to the rotation of said bodies in opposite directions. It is not broadly new to apply this principle tapping attachments to effect disengagement of the tap from the work by causing the tap to rotate in the same direction as the work, but at a faster rate of speed.

What is new, however, in addition to other features of construction herein disclosed, is the mechanism which transmits rotary movement from the work holding means to the tap, and causes said tap to rotate at a faster rate of speed than the work itself.

The device has a shank 10 which is integral with a circular base 11. Said base has an annular groove 12 formed therein and a depending portion 13 integral therewith.

Encircling said base and extending partly below it, is an annular or internal gear 14. Clearance between said gear and said base is such as to enable the former to rotate around the latter. Encircling said internal gear, and extending a considerable distance below it, is a cylindrical housing 15. Screws 16 fix said housing to said internal gear and extend into annular groove 12, thus preventing axial movement of the parts relative to one another. Said shank, said base, said annular groove, said annular gear and said cylindrical housing are all in axial alignment with one another.

A gear wheel 20 is rotatably fixed to the bottom of said base 11 by means of cap screw 21. Said gear wheel is considerably smaller than annular gear 14. It is in mesh with a portion of said annular gear. It is not in axial alignment with said annular gear.

A second annular or internal gear 22 is affixed to the bottom of gear wheel 20, as by brazing or welding or by any other conventional means. Annular gear 22 is smaller than gear wheel 20 and is in axial alignment therewith.

A cylindrical sleeve 25 having an open lower end and a closed upper end is carried within the cylindrical housing 15, being affixed, as by screws 26, to depending base portion 13. Said sleeve has a circular shaft hole 27 formed in its closed upper end 28, said shaft hole and said sleeve being in axial alignment with the cylindrical housing and with annular gear 14.

A shaft 30 having an enlarged upper end 31 and a reduced and threaded lower end 32 is rotatably carried within said shaft hole 27. The shoulder 33 of the enlarged upper end abuts the closed upper end 28 of the sleeve, and prevents downward displacement of the shaft 30. Between the shaft 30 proper, and its reduced and threaded lower end 32, is a portion 34 which is cut to square cross sectional shape.

Affixed to enlarged upper shaft end 31, as by brazing, is a small external ring gear 35, said gear being in axial alignment with shaft 30, and being in mesh with annular gear 22.

A second cylindrical sleeve 40, having an open lower end and a closed upper end 41 with a shaft hole 42 formed therein, is slidably mounted on shaft 30, immediately below closed end 28 of sleeve 25. Sleeves 40 and 25 are coaxial.

A plurality of bore holes 43 are formed in the closed end 41 of sleeve 40, and a corresponding number of pins 44 are fixed therein, projecting therefrom at top and bottom. A corresponding number of bore holes 45, of a size suitable for accommodation of pins 44, are formed in the under surface of closed end 28 of sleeve 25. Pins 44 and holes 45 are in registration with one another.

A ring 46 having a square center aperture is mounted on the square section 34 of shaft 30. A nut 47 carried by threaded lower end 32 of shaft 30 prevents downward displacement of said ring. Ring 46 is provided, in its upper surface, with a plurality of bore holes 48 which correspond in size and location to bore holes 45. Bore holes 48 register with pins 44 and are adapted to receive their projecting lower ends. A helical torsion spring 49 is mounted on shaft 30 between and against the upper end 41 of sleeve 40 and ring 46. Said spring urges members 40 and 46 apart thereby forcing the projecting upper ends of pins 44 to enter bore holes 45.

It will be noted that sleeve 40 flares outwardly to form a skirt 50 which has a larger outer circumference than the sleeve itself. A vertical keyslot 51 is formed in the inner surface of the skirt. A horizontal hole 52 is formed in the sleeve proper, immediately above the skirt. The hole is tapered, slightly, having a smaller diameter at the inside of the sleeve and a larger diameter at the outside of the sleeve. Hole 52 accommodates a steel ball 53 whose diameter is larger than the thickness of the sleeve wall.

Slidably mounted between sleeves 25 and 40 is a sleeve 54 which unlike the first mentioned sleeves, is open at both ends. The external diameter of sleeve 54 is uniform throughout, but by reason of its thickened upper end 55, said sleeve has a smaller internal diameter at its said upper end. Actually, sleeve 54 flares inwardly and upwardly to form thickened end 55 in the same measure and manner that sleeve 40 flares outwardly and downwardly to form skirt 50. As appears in Figure 2, the two members complement one another, the shoulder of the skirt 50 forming a seat for the shoulder of the thickened end portion 55. A helical torsion spring 56 is mounted on sleeve 40 between and against the closed end 28 of sleeve 25 and sleeve 54. Said spring urges said sleeve 54 downwardly against the shoulder of skirt 50. It will be noted that when sleeve 54 assumes this position, it engages ball 53 and causes the ball to move inwardly in hole 52 and to project into the cavity or space within sleeve 40.

Disposed within sleeve 40, immediately below the threaded end of shaft 30 is a chuck or sleeve 60 which is adapted to receive the tapping tool 61. A set screw 62 fixes the tool against longitudinal displacement within the chuck 60. A vertical key slot 63 in the side of said chuck receives a key 64 which is also received by key slot 51. This prevents rotary movement of chuck 60 relative to sleeve 40. A small recess or socket 65 in the side of the chuck 60 receives ball 53 when sleeve 54 pushes said ball inwardly. When the ball is in the socket, movement of the chuck relative to sleeve 40 is prevented, particularly axial movement. Chuck 60, tapping tool 61, all of the sleeves above mentioned, and shank 10 are in axial alignment with each other.

The device is provided with still another cylindrical sleeve, sleeve 70. Said sleeve is slidably carried between sleeve 25 and housing 15. Sleeve 70 has a vertical slot 71 formed in it, which receives the inwardly projecting end of screw 72 carried by housing 15. The inwardly projecting end of the screw is bare of threads and serves the function of a pin in slot 71, preventing rotary movement of sleeve 70 relative to housing 15, and permitting axial movement thereof, relative to said housing, within the predetermined limits of the slot. At the bottom of the sleeve 70, and inwardly thereof, is formed an internal flange 73 which carries three downwardly facing, radially disposed spurs 74. Spurs, flange and sleeve are all made preferably, but not necessarily, of a single piece of metal.

A third helical torsion spring, spring 75, is carried within housing 15, bearing at its lower end, against sleeve 70, and at its upper end, against ring 76 which abuts annular gear 14. Spring 75 acts to urge sleeve 70 downwards to the extent that this is permitted by the pin and slot arrangement above described.

In Figure 6 a typical work holding chuck 80 is shown, including radial slots 81 which are formed between the jaws 82 thereof. It will be noted that these slots have been extended into the casing 83 of the chuck. The purpose of this is to provide longer slots possessing greater bearing area. Slots 81 and spurs 74 are in registration with each other, the slots being adapted to receive the spurs. A typical piece of work 84 is shown in Figure 2, being held by said jaws 82 in operative position relative to the tapping tool.

Sleeve 70, tap holding chuck 60, tapping tool 61, all of the sleeves previously mentioned and work holding chuck 80 are axially aligned with each other.

The device is operated as follows:

The turret is moved forward in the direction of the work holding chuck 80 and spurs 74 are caused to enter slots 81 of said chuck. The chuck is made to rotate in the usual manner and by the usual means. This causes the following members to rotate: the sleeve 70, housing 15, annular gear 14, gear wheel 20, annular gear 22, ring gear 35, shaft 30 and ring 46. The gear system and ratios are such that ring 46 rotates at a speed which is approximately twice the speed of rotation of the work holding chuck 80, the direction of rotation being the same. Thus far, none of the other members rotates.

The turret is now moved farther forward, thus causing sleeve 70 to move forward against the action of spring 75, and the tapping tool is brought into engagement with the work. Forward movement of the turret continues until it reaches a predetermined point and the tapping operation is complete. The tapping tool, which still engages the work, is now automatically pulled forward, and with it, the tap holding chuck 60 and the sleeve 40, this forward movement being against the action of the spring 49. Pins 44 are caused to leave bore holes 45 and by reason thereof, and of the fact that the tapping tool still engages the work, the tool begins to rotate at a speed equal to that of the work. This automatically causes corresponding rotation of tap holding chuck 60 and sleeve 40.

The turret is now moved back, but by reason of the engagement of the tapping tool with the work, the tapping tool, tapping tool holding chuck 60 and sleeve 40 remain behind. This results in pins 44 entering holes 48 in ring 46. Since ring 46 is rotating at a speed twice that of the work holding chuck 80, in the same direction therewith, sleeve 40, chuck 60 and the tapping tool are also made to rotate at twice the speed of the work holding chuck 80, in the same direction therewith.

The speed differential between tapping tool and work has the same effect upon the relationship between the two, as would rotation thereof in opposite directions. The tapping tool is, accordingly, caused to be disengaged from the work. The turret is moved back still farther, the spurs 74 are caused to leave the work holding chuck slots 81 and the tool and tool holding means are completely free from the work and work holding means.

The device hereinabove described may be used in connection with a die instead of a tapping tool, for cutting external threads. It may also be used in connection with other tools.

Only a preferred embodiment of the device has herein been described. Constructional modification thereof may be incorporated therein without departing from the principles of the invention.

I claim:

1. An automatic tapping and threading attachment for use in conjunction with work holding and rotating means, said attachment comprising a tool, rotatable tool holding means, a train of speed increasing transmission gears, rotatable telescoping sleeves which are fixed against rotary movement relative to one another, said sleeves being coaxial with the work holding and rotating means, automatic engaging means for causing engagement of the sleeves with the work holding and rotating means, means connecting said sleeves with said transmission gears, and automatic engaging means for causing engagement of the transmission gears with the tool holding means.

2. An automatic tapping and threading attachment for use in conjunction with work holding and rotating means having jaws, and slots between the jaws, said attachment comprising a tool, rotatable tool holding means, a train of speed increasing transmission gears, rotatable telescoping sleeves which are fixed against relative rotary movement, said sleeves being coaxial with the work holding and rotating means, spurs connected with the lower of said sleeves which are adapted to enter the slots between the jaws of the work holding and rotating means, means connecting the upper of said sleeves with said transmission gears and automatic means for causing engagement of the transmission gears with the tool holding means.

3. An automatic tapping and threading attachment for use in conjunction with work holding and rotating means having jaws and slots between the jaws, said attachment comprising a tool, rotatable tool holding means, a train of speed increasing transmission gears, rotatable telescoping sleeves which are fixed against relative rotary movement, said sleeves being coaxial with the work holding and rotating means, spurs connected with the lower of said sleeves which are adapted to enter the slots between the jaws of the work holding and rotating means, means connecting the upper of said sleeves with said transmission gears, and automatic means, responsive to movement of the tool in the direction of the work at the conclusion of the operation, for causing engagement of the transmission gears with the tool holding means.

4. An attachment in accordance with claim 3, wherein the tool holding means comprises a rotatable sleeve and a chuck mounted in said sleeve, the chuck and sleeve being fixed against relative rotary movement, and wherein the automatic engaging means comprises a rotatable member connected with the transmission gears, holes in said rotatable member, pins having a smaller diameter than said holes being affixed to said rotatable sleeve, and torsion springs separating said rotatable sleeve and said rotatable member, said pins being adapted to enter said holes when, following the operation, the rotatable sleeve moves against the action of the springs in the direction of the work.

JACK ROSENTHAL.